United States Patent
Ishizawa et al.

[11] Patent Number: 5,930,081
[45] Date of Patent: Jul. 27, 1999

[54] MAGNETIC HEAD HOLDER HAVING PROTRUSION PORTIONS THERMALLY FUSION-BONDED TO A MAGNETIC HEAD CORE

[75] Inventors: Takashi Ishizawa; Toru Nakajima, both of Yamagata, Japan

[73] Assignee: Mitsumi Electric, Co., Ltd., Tokyo, Japan

[21] Appl. No.: 08/961,270

[22] Filed: Oct. 30, 1997

[30] Foreign Application Priority Data

Oct. 31, 1996 [JP] Japan .................................. 8-305600

[51] Int. Cl.⁶ .................................................. G11B 5/49
[52] U.S. Cl. .......................................... 360/104; 360/129
[58] Field of Search .................................. 360/104, 118, 360/125, 126, 129

[56] References Cited

U.S. PATENT DOCUMENTS

| | | | |
|---|---|---|---|
| 4,375,071 | 2/1983 | Crowley et al. ......................... | 360/104 |
| 4,628,386 | 12/1986 | Chabrolle ................................ | 360/104 |
| 4,713,706 | 12/1987 | Oosaka et al. .......................... | 360/104 |
| 4,750,066 | 6/1988 | Kunze ..................................... | 360/104 |
| 4,883,950 | 11/1989 | Chiba et al. ............................ | 360/129 |
| 4,926,278 | 5/1990 | Schoenmakers ................... | 360/130.21 |
| 5,146,377 | 9/1992 | Baheri ..................................... | 360/109 |
| 5,180,903 | 1/1993 | Shigeno et al. ........................ | 360/121 |
| 5,742,460 | 4/1998 | Park ......................................... | 360/118 |
| 5,822,160 | 10/1998 | Lee ......................................... | 360/118 |

*Primary Examiner*—Jefferson Evans
*Attorney, Agent, or Firm*—Whitham, Curtis & Whitham

[57] ABSTRACT

A magnetic head in which a holder (25) of a nonmagnetic material is connected to a magnetic head core (20) by bonding, wherein protrusion portions (26 and 27) are integrally formed on the holder (25) so that the protrusion portions (26 and 27) are made to pass through the magnetic head core (20) and top end portions (26a and 27a) of the protrusion portions (26 and 27) are thermally fusion-bonded to the magnetic head core (20) to thereby connect the holder (25) to the magnetic head core (20).

3 Claims, 3 Drawing Sheets

MAGNETIC HEAD HOLDER HAVING PROTRUSION PORTIONS THERMALLY FUSION-BONDED TO A MAGNETIC HEAD CORE

BACKGROUND OF THE INVENTION

1. Field of the Invention

The present invention relates to a magnetic head, and particularly to a structure of connection of a holder to a magnetic head core in an erasing magnetic head.

2. Related art

FIGS. 4 and 5 are views for explaining a conventional erasing magnetic head. In these drawings, the reference numeral 2 designates a magnetic head core formed of a magnetic material and constituted by front cores 2a and 2b connected to each other at their one ends, and a center core 2c having one end connected to the front cores 2a and 2b; 4, a coil bobbin mounted on the center core 2c and wound with a coil 5; 7 a terminal substrate formed of an electrically insulating material fixed to the magnetic head core 2 and planted with terminals 8 to which end portions of coils 5 are connected; and 9, a holder formed of a nonmagnetic material. Here, the other end of the center core 2c and the respective other ends of the front cores 2a and 2bform tracks 10 and 11.

The connection of the holder 9 to the magnetic head core 2 is performed by use of an adhesive agent to thereby obtain such a magnetic head as shown in FIG. 5.

In the aforementioned configuration, however, because an adhesive agent is used when the holder 9 is connected to the magnetic head core 2, the magnetic head core 2 and the holder 9 must be held with a suitable pressure until the adhesive agent is hardened. Accordingly, there arises a problem that this method is not suitable for improvement of productivity, or the like, because of the necessity of a holding jig, or the like.

SUMMARY OF THE INVENTION

The foregoing problem can be solved by a magnetic head in which a holder of a nonmagnetic material is connected to a magnetic head core by bonding, wherein protrusion portions are integrally formed on the holder so that the protrusion portions are made to pass through the magnetic head core and top end portions of the protrusion portions are thermally fusion-bonded to the magnetic head core to thereby connect the holder to the magnetic head core.

In order to solve the foregoing problem, preferably, the protrusion portions are formed of a thermoplastic resin.

In order to solve the foregoing problem, preferably, the magnetic head core includes a center core, and front cores disposed on opposite sides of the center core so that the protrusion portions are made to pass through the magnetic head core from gaps between the center core and the front cores.

According to the aforementioned configuration, because no adhesive agent is used for connecting the holder to the magnetic head core, no holding jig is required during hardening of the adhesive agent and also the connecting time can be shortened to improve the productivity.

Further, when the protrusion portions are formed of a thermoplastic resin, not only can the protrusion portions be integrally molded together with the holder but also the protrusion portions are suitable for thermally fusion-bonding.

Further, when the magnetic head core includes a center core, and front cores disposed on the opposite sides of the center core and the protrusion portions are made to pass through the magnetic head core from gaps between the center core and the front cores, the work of making the protrusion portions pass through the magnetic head core becomes easy.

DETAILED DESCRIPTION OF THE PREFERRED EMBODIMENTS

Figure 1:
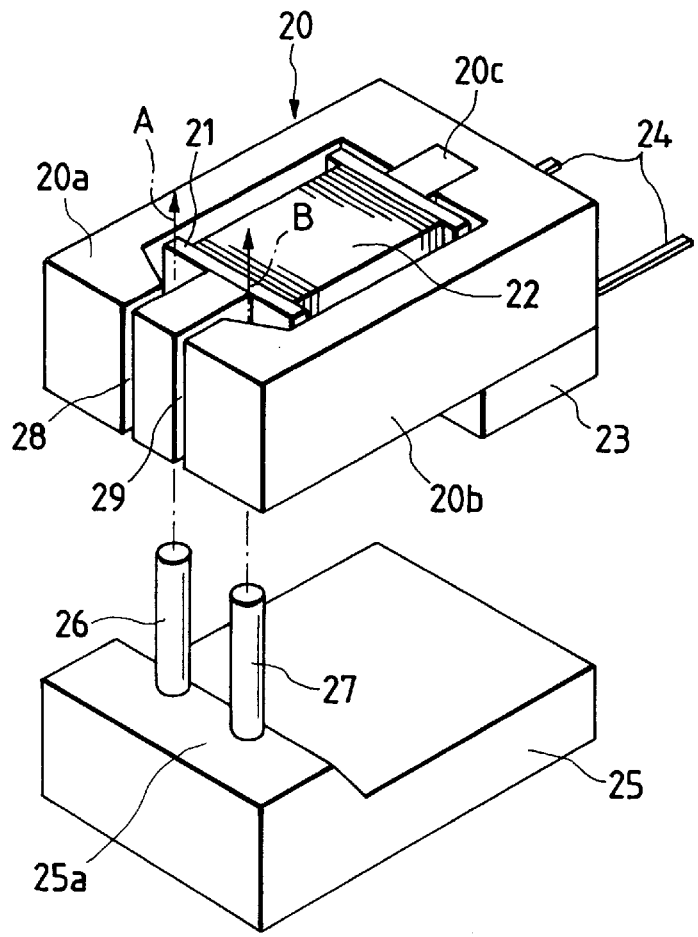
FIG. 1 is a partly exploded perspective view showing an embodiment of a magnetic head according to the present invention.

A magnetic head according to the present invention will be described with reference to FIGS. 1, 2 and 3. In FIG. 1, the reference numeral 20 designates a magnetic head core formed of a magnetic material and constituted by front cores 20a and 20b connected to each other at their one ends, and a center core 20c having one end connected to the front cores 20a and 20b; 21, a coil bobbin mounted on the center core 20c and wound with a coil 22; 23, a terminal substrate formed of an electrically insulating material fixed to the magnetic head core 20 and planted with terminals 24 to which end portions of the coil 22 are electrically connected; and 25, a holder of a nonmagnetic material formed of a thermoplastic resin such as plastic, or the like, on which columnar protrusion portions 26 and 27 are integrally formed. Here, the other end of the center core 20c and the respective other ends of the front cores 20a and 20b form tracks 28 and 29.

The connection of the holder 25 to the magnetic head core 20 is performed, first, by attachment of the holder 25 in the direction of the arrows A and B as shown in FIG. 1. That is, the protrusion portions 26 and 27 of the holder 25 are made to pass through the magnetic head core 20 from gaps formed between the center core 20c of the magnetic head core 20 and the front cores 20a and 20b of the magnetic head core 20, so that an upper surface 25a of the holder 25 is bonded to a lower surface of the magnetic head core 20. FIG. 2 shows a state in which the protrusion portions 26 and 27 have been made to pass through the magnetic head core 20.

Figure 2:
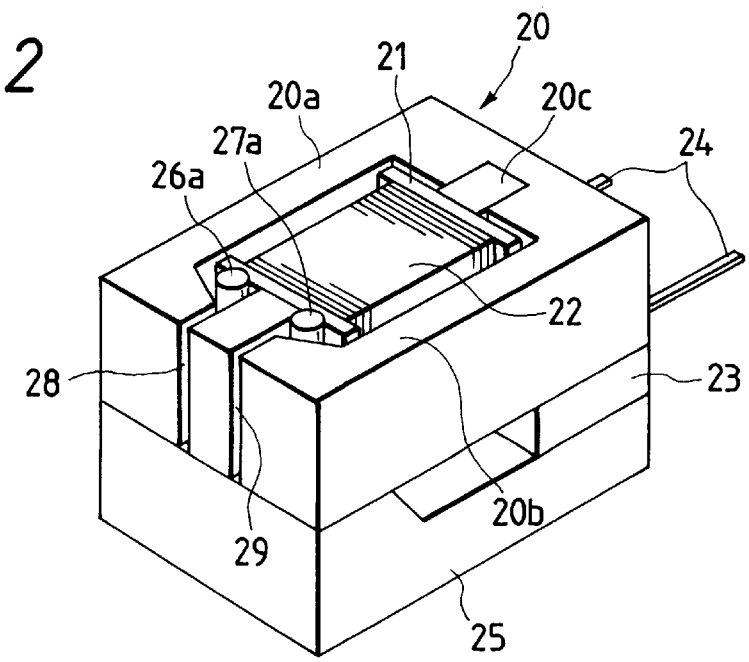
FIG. 2 is a perspective view of a before-thermally-fusion-bonding state showing an embodiment of the magnetic head according to the present invention.
Figure 3:
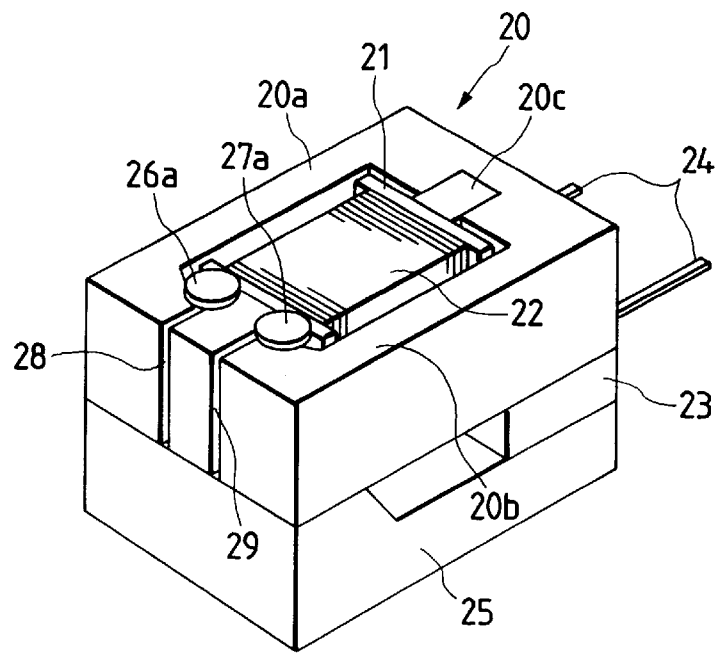
FIG. 3 is a perspective view showing an embodiment of the magnetic head according to the present invention.
Figure 4:
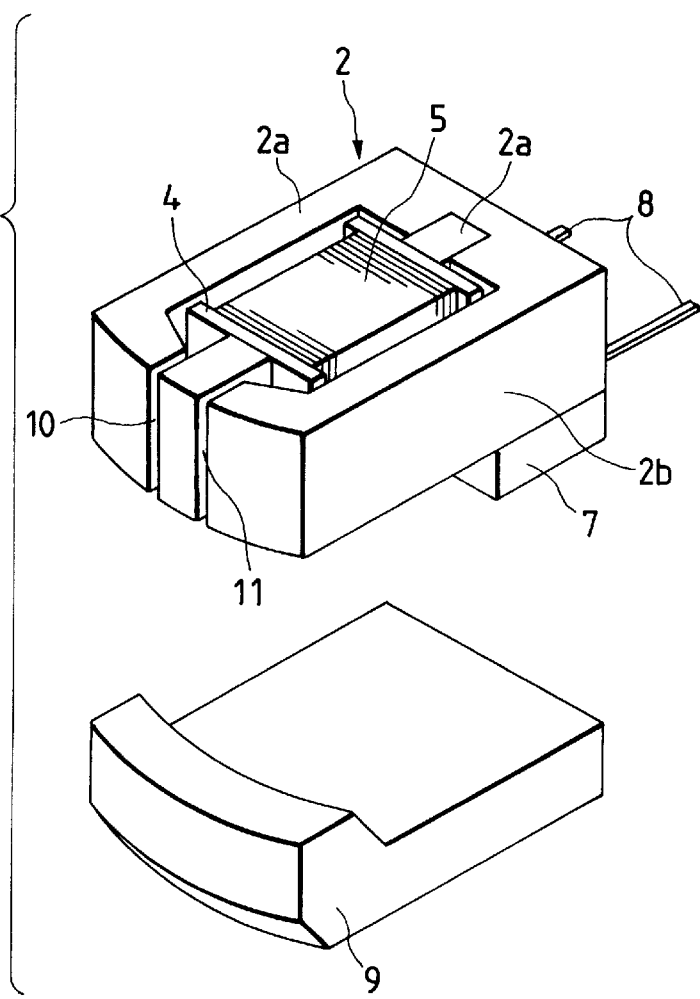
FIG. 4 is a partly exploded perspective view showing a conventional magnetic head.
Figure 5:
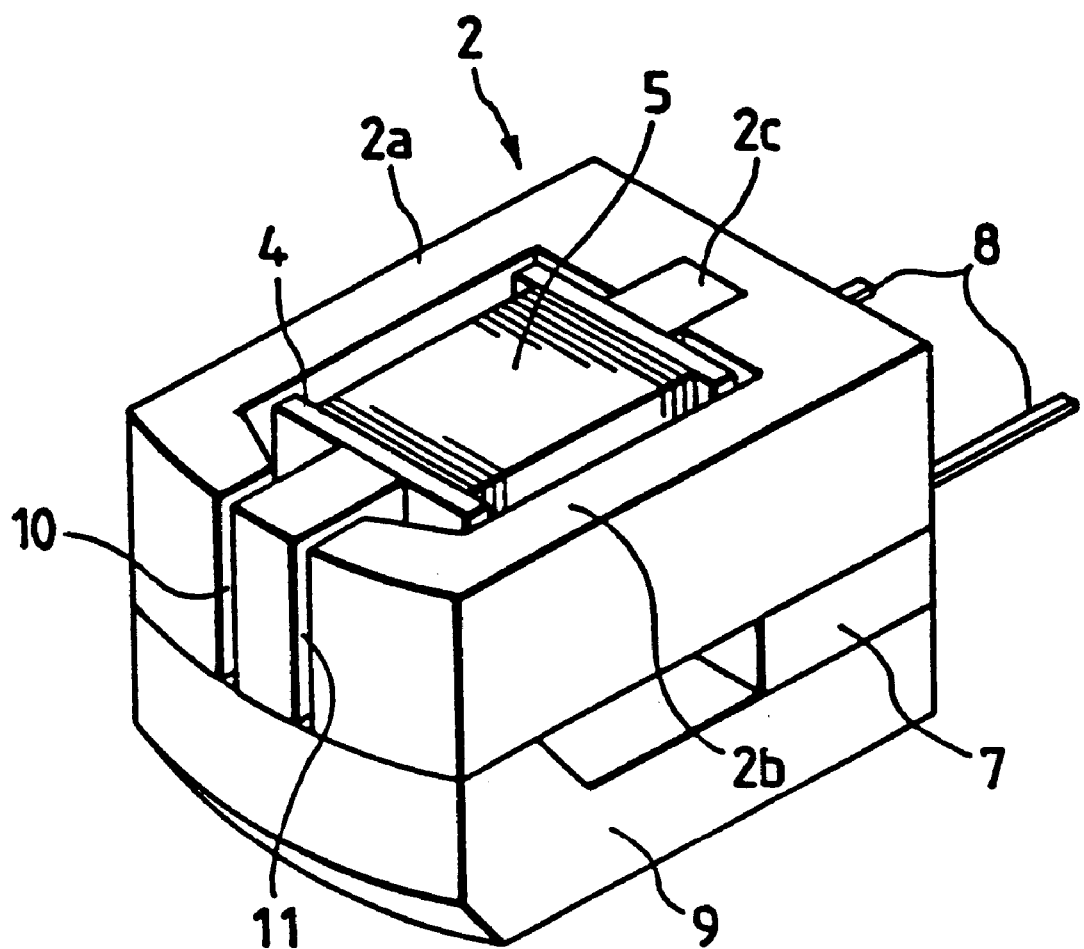
FIG. 5 is a perspective view showing the conventional magnetic head.

In the state of FIG. 2, top end portions 26a and 27a of the protrusion portions 26 and 27 projecting out of the magnetic head core 20 are thermally fused. The top end portions 26a and 27a thus thermally fused are thermally fusion-bonded to the magnetic head core 20 to thereby obtain a magnetic head.

As described above, the magnetic head according to the present invention is a magnetic head in which a holder of a nonmagnetic material is connected to a magnetic head core by bonding, in which protrusion portions are integrally formed on the holder so that the protrusion portions are made to pass through the magnetic head core and top end portions of the protrusion portions are thermally fusion-bonded to the magnetic head core to thereby connect the holder to the magnetic head core. Accordingly, because no adhesive agent is used for connecting the holder to the magnetic head core, no holding jig is required during hardening of the adhesive agent and also the connecting time can be shortened to improve the productivity.

Further, when the protrusion portions are formed of a thermoplastic resin, not only the protrusion portions can be integrally molded together with the holder but also the protrusion portions are suitable for thermally fusion-bonding.

Further, when the magnetic head core includes a center core, and front cores disposed on the opposite sides of the center core and the protrusion portions are made to pass through the magnetic head core from gaps between the center core and the front cores, the work of making the protrusion portions pass through the magnetic head core becomes easy.

Although the above description has been made upon the case where a columnar shape is used as the shape of each of the protrusion portions 26 and 27, another shape such as the shape of a rectangular pipe or the like may be used. Further, the number of the protrusion portions 26 and 27 is not limited to 2 but may alternatively be 1, 3, or 4. In addition, the magnetic head may be any magnetic head other than the erasing magnetic head.

What is claimed is:

1. A magnetic head comprising:

a holder made of a nonmagnetic material;

a magnetic head core to which said holder is connected by bonding; and protrusion portions integrally formed on said holder, said protrusion portions passing through said magnetic head core, and top end portions of said protrusion portions thermally fusion-bonding to said magnetic head core to connect said holder to said magnetic head core.

2. A magnetic head according to claim 1, wherein said protrusion portions are formed of a thermoplastic resin.

3. A magnetic head according to claim 1, said magnetic head core includes a center core, and front cores disposed on opposite sides of said center core so that said protrusion portions are made to pass through said magnetic head core from gaps between said center core and said front cores.

\* \* \* \* \*